(12) United States Patent
Herz et al.

(10) Patent No.: US 7,142,758 B1
(45) Date of Patent: Nov. 28, 2006

(54) OPTICAL FIBER WITH QUANTUM DOTS

(75) Inventors: Erik Herz, Ithaca, NY (US); Carvel Holton, Blacksburg, VA (US); Kenith Meissner, College Station, TX (US); Corey Paye, Blacksburg, VA (US)

(73) Assignees: Virginia Tech Intellectual Properties, Inc., Blacksburg, VA (US); Lambda Instruments, Inc., Blacksburg, VA (US)

( * ) Notice: Subject to any disclaimer, the term of this patent is extended or adjusted under 35 U.S.C. 154(b) by 0 days.

(21) Appl. No.: 11/328,246

(22) Filed: Jan. 10, 2006

Related U.S. Application Data

(62) Division of application No. 10/863,823, filed on Jun. 9, 2004, now Pat. No. 7,054,513.

(60) Provisional application No. 60/543,620, filed on Feb. 12, 2004, provisional application No. 60/476,650, filed on Jun. 9, 2003.

(51) Int. Cl.
   G02B 6/02 (2006.01)
   G02B 6/00 (2006.01)

(52) U.S. Cl. ........................ 385/125; 385/122

(58) Field of Classification Search ............. None
   See application file for complete search history.

(56) References Cited

U.S. PATENT DOCUMENTS

| | | | |
|---|---|---|---|
| 5,260,957 A | 11/1993 | Hakimi et al. | |
| 5,881,200 A | 3/1999 | Burt | |
| 6,577,801 B1* | 6/2003 | Broderick et al. | 385/125 |
| 6,710,366 B1 | 3/2004 | Lee et al. | |
| 6,850,679 B1* | 2/2005 | Hasegawa | 385/125 |

OTHER PUBLICATIONS

Monro et al. "Holey fibers with random cladding distributions" Optic Letters, vol. 25, No. 4; Feb. 15, 2000.
Pickrell et al. "Novel Techniques for the Fabrication of Holey Optical Fibers" Spie Conference Proceedings, vol. 4578, ppg271-282; 2001.

* cited by examiner

*Primary Examiner*—Juliana Kang
(74) *Attorney, Agent, or Firm*—Whitham, Curtis, Christofferson & Cook, PC

(57) ABSTRACT

Holey optical fibers (e.g. photonic fibers, random-hole fibers) are fabricated with quantum dots disposed in the holes. The quantum dots can provide light amplification and sensing functions, for example. When used for sensing, the dots will experience altered optical properties (e.g. altered fluorescence or absorption wavelength) in response to certain chemicals, biological elements, radiation, high energy particles, electrical or magnetic fields, or thermal/mechanical deformations. Since the dots are disposed in the holes, the dots interact with the evanescent field of core-confined light. Quantum dots can be damaged by high heat, and so typically cannot be embedded within conventional silica optical fibers. In the present invention, dots can be carried into the holes by a solvent at room temperature. The present invention also includes solid glass fibers made of low melting point materials (e.g. phosphate glass, lead oxide glass) with embedded quantum dots.

12 Claims, 5 Drawing Sheets

OPTICAL FIBER WITH QUANTUM DOTS

CROSS-REFERENCE TO RELATED APPLICATIONS

The present application is a divisional of U.S. patent application Ser. No. 10/863,823, filed Jun. 9, 2004 now U.S. Pat. No. 7,054,513, which claims the benefit of priority from co-pending provisional applications 60/476,650 filed on Jun. 9, 2003 and 60/543,620, filed on Feb. 12, 2004, the complete contents of which are herein incorporated by reference.

FIELD OF THE INVENTION

The present invention provides optical fibers (holey fibers or low melting point glass fibers) containing quantum dots. The present invention relates generally to fiber-based sensors, lasers, modulators, wavelength converters, filters, linear and non-linear elements.

BACKGROUND OF THE INVENTION

Quantum dots are nanometer-scale particles (e.g., typically 1–10 nanometers in diameter) of metal, dielectric or semiconductor material. Quantum dots are commonly made of compound semiconductors such as CdSe, ZnSe, or PbS and may be manufactured in solid hosts, films, suspensions or other material formats Quantum dots are well known for providing useful optical properties when incorporated into polymeric and glass materials. Specifically, quantum dots can provide optical amplification, saturable absorption, or nonlinear effects for example. As understood in the art, the term quantum dot may apply to particles in the form of spheres, rods, wires, etc. The term 'quantum dot' herein refers to any such forms as are known in the art.

U.S. Pat. No. 5,881,200 to Burt, for example teaches an optical fiber with a hollow core filled with a quantum dot colloid. The quantum dots provide an optical gain medium that can be used as a laser amplifier. Similarly, U.S. Pat. No. 5,260,957 to Hakimi et al. teaches a polymeric optical waveguide containing quantum dots that provide lasing capability. U.S. Pat. No. 6,710,366 also teaches matrix composite materials with quantum dots having nonlinear optical properties.

Incorporating quantum dots into optical fibers and waveguides can be problematic because of the sensitive nature of quantum dots. For example, many quantum dots are not able to withstand high temperatures (e.g., above 1000 C) required for melting glass or silica. Specifically, quantum dots from compound semiconductors can dissociate or diffuse into glass at high temperatures. Quantum dots typically cannot be directly incorporated into a silica optical fiber because they will be destroyed during the high heat (e.g. 1500 C) drawing process. Also, quantum dots can be damaged by oxidation.

Many quantum dots provide superior electronic and optical properties when they are coated with a core shell material such as TOPO. Such core shells can prevent oxidation and enhance electron confinement, and may even be essential in some applications. However, core shell materials are often polymeric and are often destroyed by high temperatures.

However, there are many potential applications for optical fibers (particularly glass fibers) having quantum dots. It would be an advance in the art to provide glass optical fibers having quantum dots that retain desirable electronic and optical properties unaltered by high heat. Additionally, it would be an advance in the art to provide new optical fiber structures and materials that are compatible with quantum dots and with conventional optical fibers.

SUMMARY OF THE INVENTION

The present invention includes a holey optical fiber having a plurality of holes that provide light confinement. A plurality of quantum dots are disposed within the holes. The quantum dots provide wavelength conversion, amplification, fluorescence, absorption, lasing and other linear and non-linear functions to the fiber.

The fiber can be a regular or irregular array holey fiber, a photonic crystal fiber, an index-guiding fiber, a random-hole holey fiber, or combinations thereof, for example. The holes can be disposed in the cladding, both the core and cladding, or a plurality of cores and claddings with a plurality of geometric cross-sections.

The quantum dots can be suspended in a solvent that is also disposed in the holes. Alternatively, there is no solvent, and the quantum dots re supported by sidewalls of the holes. The quantum dots can preferably have diameters in the range of about 0.5–100 nanometers.

The present invention also includes an optical fiber made of glass having a drawing temperature less than 700 Celsius, and having quantum dots embedded in the glass. The glass can be a phosphate glass or a lead glass (e.g. comprising more than 40% phosphate or lead). The glass may also have a drawing temperature less than 500 Celsius.

The quantum dots can be disposed in the core, the cladding or both.

The present invention also includes a method for making holey optical fibers with quantum dots disposed in the holes. In the present method, the holey optical fiber is submerged in a colloid or suspension of quantum dots in a solvent. The quantum dots are drawn into the holes by capillary action. A cut end of the holey fiber may be submerged in the quantum dot colloid.

DETAILED DESCRIPTION OF THE PREFERRED EMBODIMENTS OF THE INVENTION

The present invention provides optical fibers having quantum dots. The fibers are holey fibers and can be photonic fibers, index guiding holey fibers, or random-hole holey fibers. In the present invention, the quantum dots are incorporated into the holes of the holey fibers. The holes can be in the cladding or core of the fiber. Even if the quantum dots are disposed in the cladding, where core-confined light exists as an evanescent wave, the quantum dots interact strongly with guided light and can provide amplification, sensing and other functions. The quantum dots can be inserted into the fiber by flowing a colloid or suspension of the quantum dots into the holes of the fiber. The colloid can flow under the influence of capillary forces or via other entrainment methods such as vacuum, thermal or mechanical means, and/or combinations of such means. Retention of the quantum dots may be accomplished by capillary force, splicing to conventional optical fibers, or conversion of the solvent to solid or gelatinous forms, for example.

In an alternative embodiment, the fibers can be made of low melting point glasses (e.g., lead glasses, phosphate glasses) having a working temperature (suitable for fiber drawing) less than 700 C, 600 C or 500 C. Many quantum dot materials can survive temperatures in the range of about 400–700 C.

Figure 1:
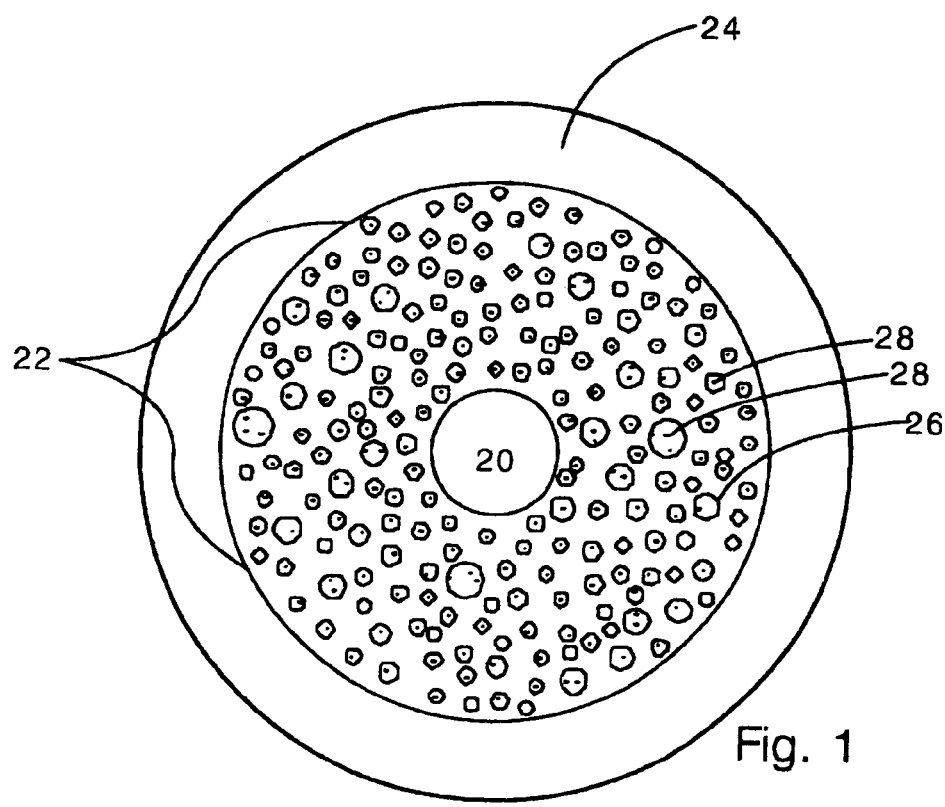
FIG. 1 shows a cross sectional view of a random hole holey fiber with quantum dots according to the present invention.

FIG. 1 shows a cross section of a random-hole holey fiber with quantum dots according to the present invention. The fiber has a solid core 20 surrounded by a cladding 22 containing a large number of randomly arranged holes 26. A solid sheath 24 surrounds the cladding 22. In the present invention, quantum dots 28 are disposed within the holes 26. The quantum dots are illustrated as small rectangles or dots.

The fiber can be made of silica, alumina (sapphire), ceramics, borosilicate glass, polymers, plastics or any other known fiber material.

Figure 9:
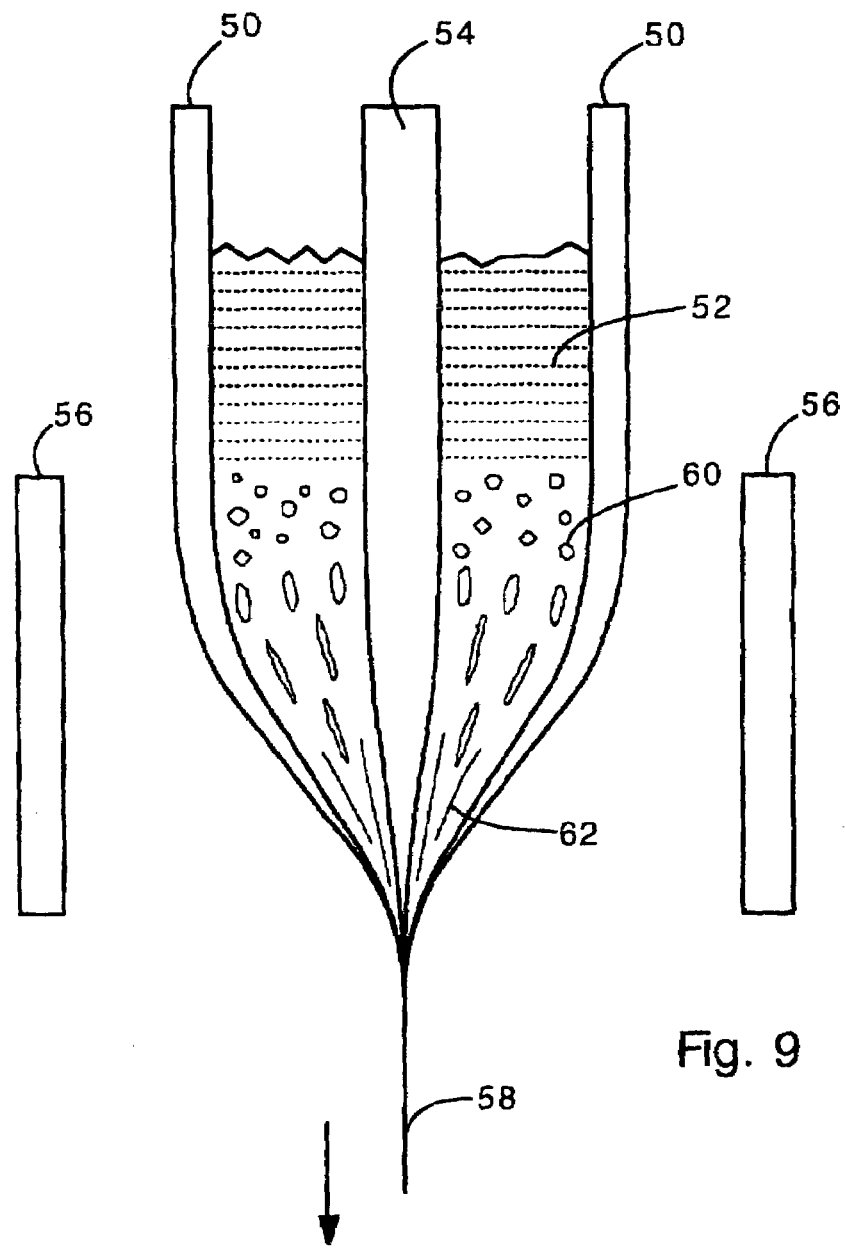
FIG. 9 illustrates a method for making random hole holey optical fiber.

The random holes 26 can have diameters in the range of tens of microns to less than a micron. The random holes can have lengths of millimeters, meters or kilometers, for example. Preferably there are hundreds of random holes in the fiber. Total required hole cross-sectional area relative to the rest of the fiber is dependent on the specific application or effect to be generated. The random hole fiber can be made by preform methods such as sol-gel processes, glass foam processes or by incorporating a gas generating material into a glass fiber perform (as examples), and then drawing the fiber from the resulting preform. FIG. 9 illustrates a method for making random-hole optical fiber based on the latter technique as an example. In the method, a fiber preform comprises a silica tube 50 filled with a holey region forming powder 52 and a solid silica rod 54. The holey region forming powder 52 forms a fiber cladding and the solid rod 54 forms a fiber core. Heaters 56 heat the preform so that it can be pulled to form a fiber 58, as known in the art.

The holey region forming powder 52 preferably comprises a mixture of a glass material (e.g., high purity silica powder) and a gas-generating material (e.g., silicon nitride). The gas generating material produces a gas when heated above the sintering temperature of the glass material. The gas generating material can produce gas by thermal decomposition or by chemical reactions (e.g., oxidation) with other components of the holey region forming powder, for example. The gas generated within the holey region forming powder 52 forms trapped bubbles 60 as the holey region forming powder 52 sinters and softens. The bubbles 60 are stretched and drawn into elongated tubes 62 as the fiber 58 is pulled. In preferred embodiments, the glass material is silica, and the gas generating material is a nitride or carbide ceramic. Alternatively, the gas generating material can be a metal nitrate or metal carbonate (e.g. sodium nitrate or sodium carbonate). If silicon nitride is used as the gas generating material, it can be added in amounts of about 0.01–0.5% by weight. The method for making random hole fibers is also described in the paper "Microstructural Analysis of Random Hole Optical Fibers" by Pickrell et al., IEEE Photonics technology Letters, Vol. 16, No. 2, February 2004, which is hereby incorporated by reference.

The quantum dots 28 can be made of many materials including 2–6 and 3–5 compound semiconductors, tertiary compound semiconductors, germanium, silicon, ceramics, dielectrics, metals and the like as in known in the art. Specific examples of possible materials for the quantum dots include ZnS, ZnSe, ZnTe, ZnO, CdS, CdSe, CdTe, CdO, HgS, HgSe, HgTe, HgO, MgS, MgSe, MgTe, MgO, CaS, CaSe, CaTe, CaO, SrS, SrSe, SrTe, SrO, BaS, BaSe, BaTe, BaO, AlN, AlP, AlAs, AlSb, GaN, GaP, GaAs, GaSb, InN, InP, InAs, InSb PbS, PbSe, PbTe, PbO and mixtures thereof. Cadmium selenide is particularly useful because it has desirable optical properties such as fluorescence and light amplification in the visible to near infrared optical spectrum. Quantum dots may be combinations of the foregoing materials and may include core-only configurations or combined in core-shell configurations with polymer or non-polymeric shells. Shell materials can range from polymers such as Trioctyl Phosphine Oxide (TOPO) to non-polymeric such as ZnS as are known in the art.

The quantum dots can have diameters typically between 1 and 10 nm or 1 and 100 nanometers. The size of the dots will depend upon the application of the present optical fiber, the quantum dot configuration (i.e., core only, core shell, etc.) and the wavelength range to be addressed. A plurality of dot sizes may be employed to achieve arbitrary wavelength spectral effects as appropriate to the nature of the quantum dot materials. A wavelength range from 0.3 microns to beyond 2 microns is addressable in the optical fibers disclosed herein.

The quantum dots can be suspended in a liquid solvent within the holes 26. The solvent can be toluene, heptane, chloroform, xylene, acetone, hydrocarbon alcohols or the like. The quantum dots can be freely floating in the solvent, or can be supported by the sidewalls of the holes 26 (e.g., by Van der Waals forces). As noted, the quantum dots can be coated with a capping material such as TOPO, as known in the art, or can be uncoated (i.e. bare). Further, the quantum dot structure may include other molecular or atomic attachments such as chemical/biological ligands, functional molecules, etc. as are known in the art.

Compatible solvents may have an index of refraction greater or less than that of the optical fiber material into which they are entrained, depending on the functional effect to be achieved in the over-all optical fiber structure. Preferably, however, the solvent has a refractive index lower than the refractive index of the glass. As an example, quantum dots arranged in a high index solvent may enable total core confinement in random fiber core structures. Further, solvents may be used that transition to a solid state with processing or catalysis. As an example, low viscosity polymeric adhesives that transition to a solid state on exposure to UV or other wavelengths of light may be used.

Figure 10:
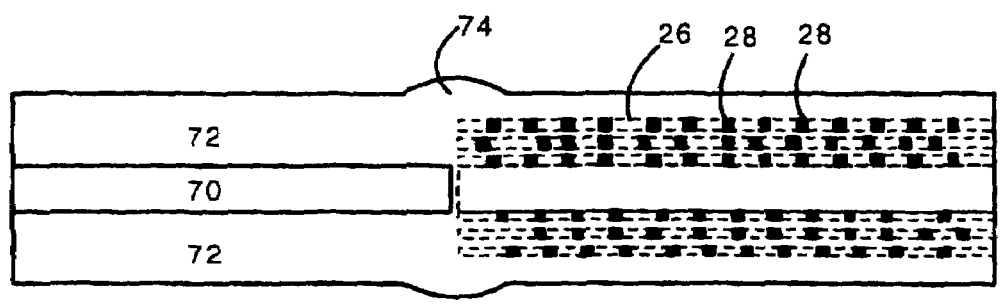
FIG. 10 shows a holey optical fiber with quantum dots according to the present invention fusion-spliced to a conventional solid fiber.

FIG. 10 shows one embodiment of the invention including a holey optical fiber with quantum dots 28 in holes 26, where the holey optical fiber is fusion-spliced at joint 74 to a conventional solid fiber composed of core 70 and 72. This embodiment demonstrates use of the holey optical fiber in conjunction with other fibers, as may occur in some sensor applications, etc.

Figure 2:
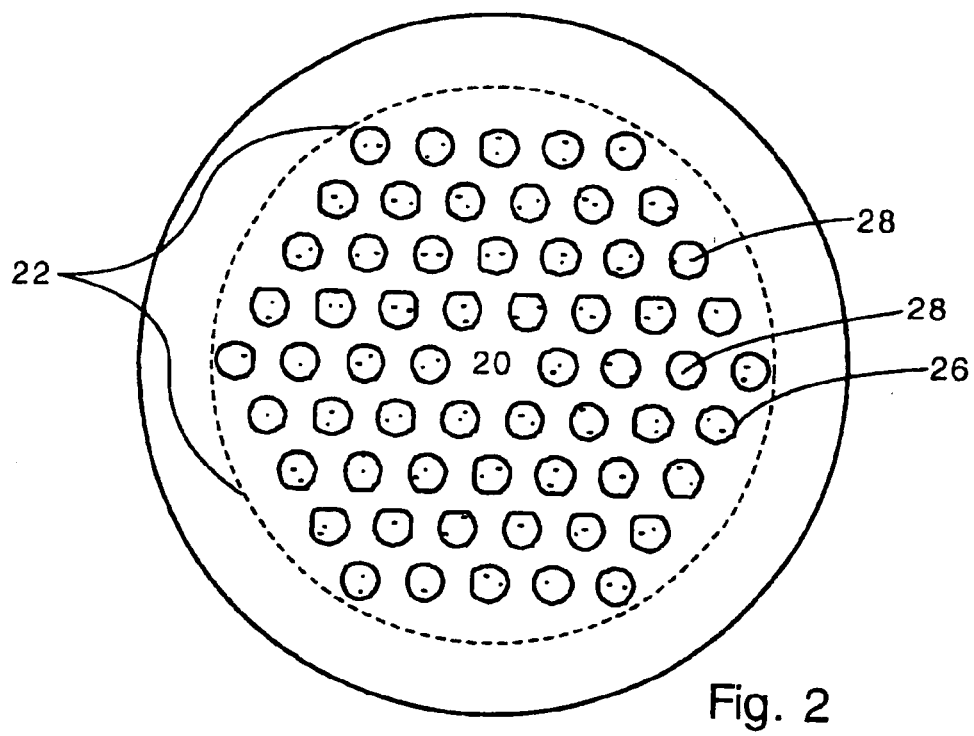
FIG. 2 shows a photonic crystal holey fiber with quantum dots according to the present invention.

FIG. 2 shows another embodiment of the invention having a photonic holey fiber. Photonic holey fibers are well known in the art. Photonic holey fibers have a regular array pattern of holes 26. The photonic holey fiber is typically made by stacking a bundle of hollow glass tubes to form a fiber preform, and then drawing the preform into a fiber. In the photonic holey fiber of FIG. 2, quantum dots 28 are disposed within the holes 26 comprising the photonic crystal lattice. The quantum dots can be suspended in a solvent or supported on the sidewalls of the holes 26. Sidewall attachment may be augmented with prior processing steps in which the wall material is treated to enhance quantum dot attachment via chemical or atomic bonding between the wall or wall impregnated materials and the quantum dot structure.

Quantum dot concentrations may vary substantially depending on the application, strength of light coupling in the materials and the interaction length to be employed. As examples, a filter may employ quantum dot concentrations less than 1% by volume, where lasing applications typically require concentrations of greater than 0.2% and prefer concentrations of greater than 1% by volume. Concentrations in coherent applications are also dependent on the diameter and length of the micro-cavities formed by the entrained holes. Smaller diameters (e.g. less than 20 um), for instance, enhance micro-cavity effects (e.g. lasing) for lower concentrations of quantum dots.

In operation, the quantum dots interact with light traveling through the core 20 of the fiber. The interaction can result in light amplification, fluorescence, wavelength-shifting, nonlinear optical effects, or environmental sensing (including radiation fields from nuclear or cosmic bombardment). Although the quantum dots are located within the holes 26, where light might exist only as an evanescent wave, the quantum dots are able to interact with light in the core and provide their effects. It is noted that the quantum dots can interact with light propagating in the core by coherent and/or incoherent scattering coupling mechanisms.

For example, in one experiment performed by the present inventors, a photonic holey fiber like the fiber of FIG. 2 has holes filled with a colloid of CdSe quantum dots in heptane (e.g. with a volume concentration of 0.2% or more). When 488 nm pump radiation is injected into the fiber core, a co-propagating 594 nm signal beam traveling through the core experiences a power gain of 100% over a distance of 10 cm from evanescent field coupling of both pump and signal to the quantum dots. The CdSe quantum dots absorb the 488 nm energy and provide optical amplification at 594 nm. The quantum dot materials had been held in the experimental fiber for in excess of a year via capillary forces alone.

It is noted that random hole holey fibers are particularly well suited for use with quantum dots according to the invention. Specifically, this is because random hole holey fibers tend to have some holes that extend to the core region of the optical fiber, where light intensity is greatest. As a result, the quantum dots located close to the core interact strongly with core-confined light.

Figure 3:
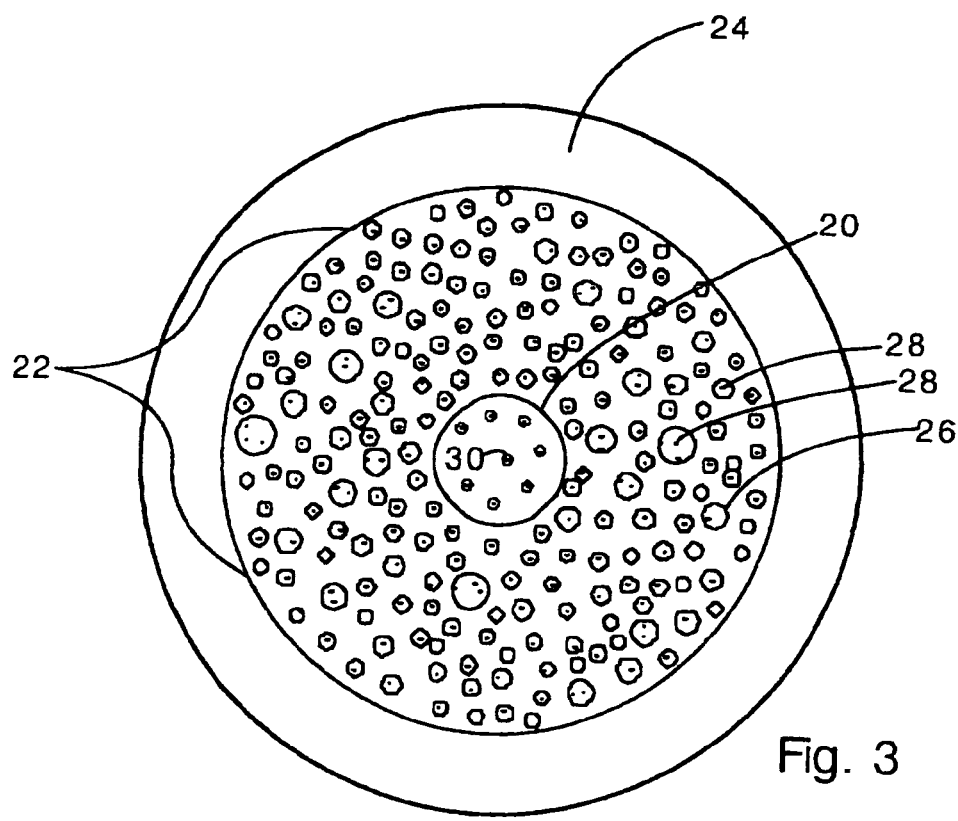
FIG. 3 shows a random hole holey fiber with holes in the core containing quantum dots according to the present invention.

FIG. 3 shows another embodiment of the present invention in which the core 20 includes holes 30. The core holes 30 may contain quantum dots. The core 20 in this embodiment has a lower porosity than the cladding 22 so that light is confined to the core 20. The fiber of FIG. 3 can be a random hole holey fiber made from a preform having gas generating material incorporated into the core and/or cladding region of the preform. An advantage of having core holes 30 with quantum dots is that the quantum dots are located in a region of high light intensity (even if they are exposed to only an evanescent wave), and so will interact strongly with light across the core 20.

Figure 4:
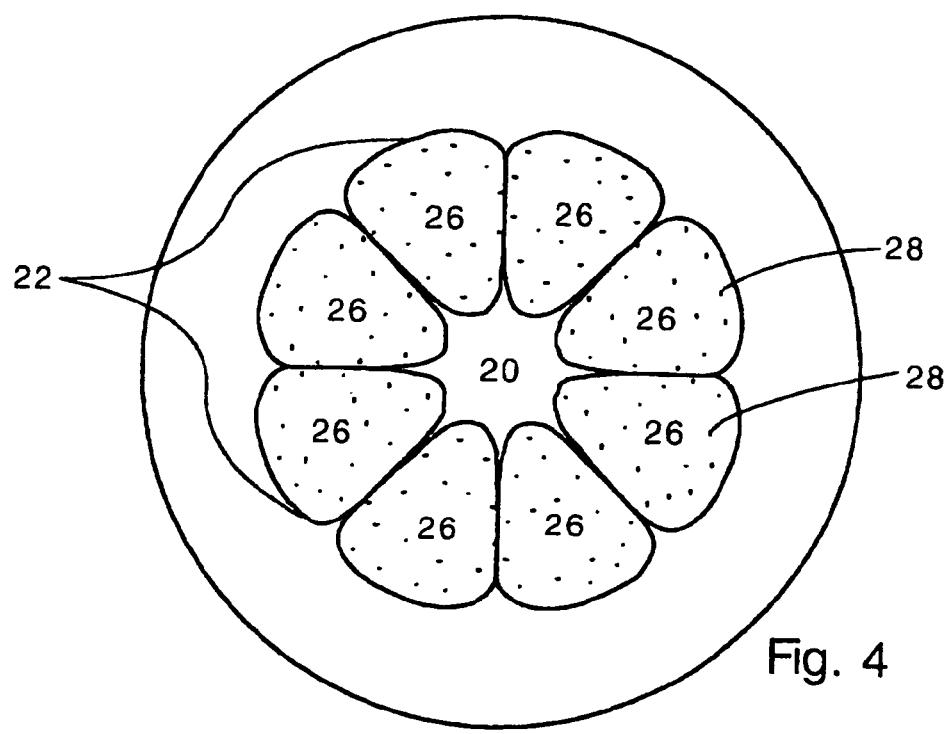
FIG. 4 shows an index-guiding holey fiber containing quantum dos according to the present invention.

FIG. 4 shows an embodiment of the invention in which the holey optical fiber is an index-guiding holey fiber, as known in the art. In this case, the optical fiber does not have a regular crystalline pattern of holes like the fiber of FIG. 2. In the present invention, Quantum dots 28 are disposed within the holes 26 of the index-guiding holey fiber. Methods for making index-guiding and photonic crystal holey fibers are well known in the art. Typically, solid rods and hollow tubes are stacked to form a fiber perform, which is then heated and drawn into a thin fiber. U.S. Pat. No. 5,155,792 to Vali et al. and U.S. Pat. No. 5,802,236 to DiGiovanni et al. describe methods for making microstructured optical fibers, and are hereby incorporated by reference in their entirety.

As is well known in the art, in conventional optical fibers, the microstructure of the fiber consists of a core region surrounded by a clad region. Holey fibers generally consist of a more complex mixture of core(s) and clad regions with interspersed holes, the totality of which is referred to herein as the fiber's microstructure. In conventional optical fibers, the core of the fiber has a higher index of refraction than the clad region leading to light guiding in the core via total internal reflection due to the index difference as noted. In this sense, the guiding region of the fiber is comprised of essentially the core. In holey fibers entrained with quantum dot bearing solvents, the index of the solvent relative to the index of the surrounding microstructure determines the guiding region or regions. For example, if the index of the solvent is uniformly lower than that of the glass microstructure in a uniform index glass holey fiber, the entire glass microstructure becomes the guiding region. If the index of the solvent is higher than the glass in this example, the solvent containing regions would become the guiding region. The guiding region would include or exclude the region conventionally designated as the core(s) of the microstructure on the basis of the index difference. Depending on microstructure details, quantum dot holey fibers may use any portion of the total microstructure as the guiding region.

Figure 5:
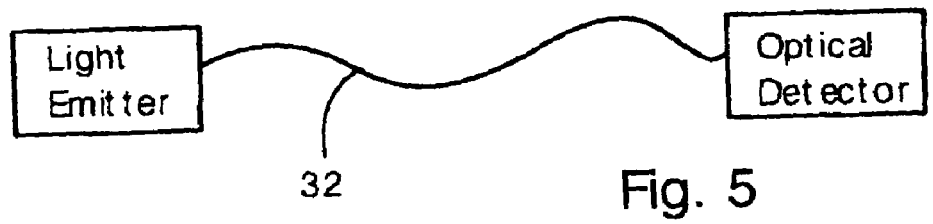
FIG. 5 shows a generalized fiber sensor according to the present invention.

The present quantum dot holey fibers can be used in a wide range of sensing applications. Quantum dots have electronic structures and optical properties that respond to a variety of chemical and physical environmental changes. For example, the present fibers can be used in pH and chemical sensors, pressure or force sensors, electric field sensors, magnetic field sensors, and temperatures sensors. Typically, sensors based on the present quantum dot holey fibers will operate to detect an optical characteristic such as a shift in fluorescence, lasing or absorption wavelength or intensity of the quantum dots. Such effects may arise from linear or non-linear optical properties. FIG. 5 shows a generalized fiber sensor according to the present invention. The sensor has a holey fiber 32 containing quantum dots. The fiber is connected to a light emitter and an optical detector. The light emitter can produce single wavelengths or a broad spectrum of wavelengths. The optical detector detects changes in absorption, lasing or fluorescence in the optical fiber caused by interactions of the quantum dots with the environment. The optical detector can be a spectrophotometer, for example.

If the index of the solvent is lower than that of the glass material, light may be guided by, and therefore confined to either the region around the holes represented by the core or the region surrounding holes represented by the cladding structure. If the fiber is coated with a low index coating instead of the high index clad typically used to strip off cladding modes, the cladding mode light will form effective light for sensor operations. This concept is very useful for all kinds of sensors, in that it preserves light for signal to noise ratio enhancements and preserves a larger fraction of the fiber sensor's cross-section for interaction with the environment.

Also, it is noted that in the sensor embodiments, the solvent can have a higher or lower refractive index than the glass.

Figure 6:
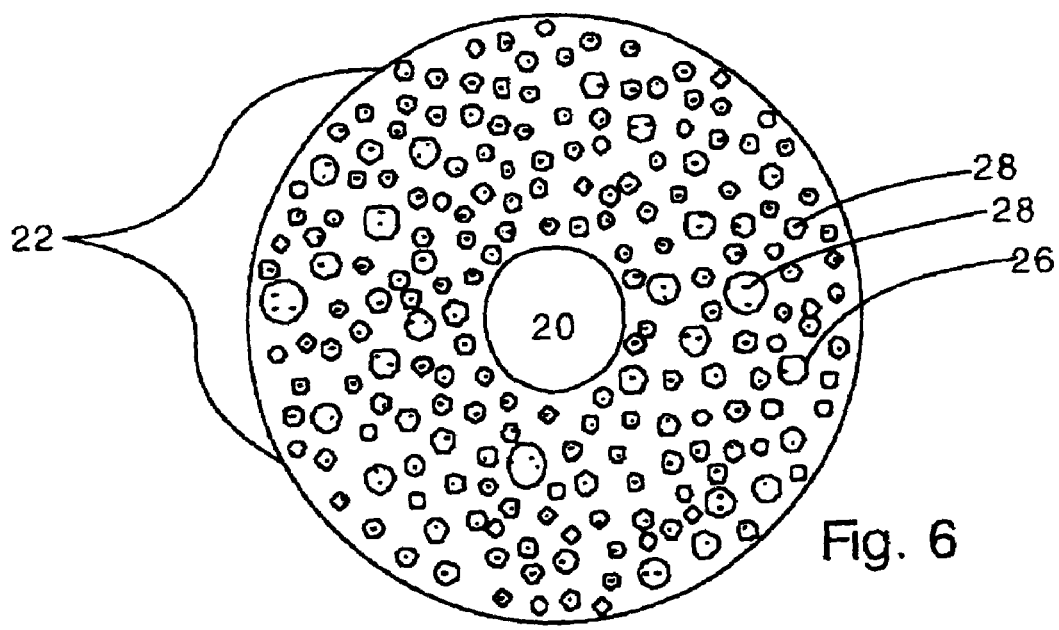
FIG. 6 shows a random hole holey fiber with the holes exposed to the environment. Exposed holes tend to increase sensor sensitivity, particularly in chemical sensing applications.

Following is a list of considerations for making different types of sensors:

pH sensor: In a pH sensor according to the present invention, quantum dots are selected that change optical properties when exposed to H+ ions or OH− ions. Examples of such quantum dots include the CdSe/ZnS core-shell dots which have been used for proof of principle tests. In use, the fiber is submerged in a liquid to detect the pH. H+ ions diffuse through the glass and come in contact with the quantum dots, thereby affecting their fluorescence, absorption, lasing or other optical characteristics. To enhance the sensitivity, and make the fiber capable of sensing species that cannot diffuse through glass (e.g., OH−), the fiber can be designed to lack the solid sheath 24. The solid sheath 24 can be removed by etching, or the fiber can be drawn without the solid sheath. Such a fiber is illustrated in FIG. 6.

Chemical/Biological sensor(s): In a chemical, biological, or bio-chemical sensor, the quantum dots can be chemically bound or essentially "coated" with a material (e.g. a polymer, biological material, ceramic or metal) that changes the optical properties of the quantum dot when it comes in contact with a chemical to be detected. For example DNA ligands or bio-hazard molecules. In this case, the species or element to be detected can be injected or diffused into the holes 26, via molecular diffusion, capillary action or other means appropriate to the state and structure of the fiber-quantum dot sensor. Alternatively, the fiber can be processed (e.g. chemically etched, mechanically abraded or cut open) so that the holes are opened to the outside world and the chemical to be detected can flow into the holes 26 again via molecular diffusion, capillary action or other means appropriate to the state and structure of the fiber-quantum dot sensor. For example, biomolecules dissolved or dispersed in water can be detected by submerging a cut fiber end in the water, and allowing the biomolecules to diffuse into the holes. One advantage to this technique is that the requisite amount of sample for analysis is in the range of nano to microliters. This allows analyte solutions to remain essentially undiminished in volume.

Force/strain sensor: Quantum dots supported or adhered to the sidewalls of the holes 26 are sensitive to the electronic state or atomic energy states of the sidewall. This is particularly true if the quantum dot lacks a coating (e.g. TOPO) or the coating of the quantum dot and wall are chosen to enhance any surface energy interactions. As a result of interactions between the quantum dots and sidewall energy states, the electronic structure and optical properties of the quantum dots will be altered by strain in the fiber material matrix. Hence, the strain or force can be detected by monitoring the optical characteristics of the quantum dots. Wavelength shifts up to 15 nm are readily observed between the fluorescent emission peaks of bulk CdSe/ZnS quantum dot-heptane colloids in a beaker and the same material entrained in holey fiber structures with a plurality of 6–14 um diameter holes. Wavelength shifts (35 nm) are likewise noted down the length of such fibers due to emission/re-absorption/filtering effects that may be modulated with micro-bending of the optical fiber.

Electric field/magnetic field sensor: it is well known that the electronic structure and optical properties of quantum dots can be altered by electric or magnetic fields. Electric and magnetic fields can be detected by monitoring changes in absorption, lasing, fluorescence or other characteristics of the quantum dots.

X-ray, Nuclear radiation or particle detection: it is well known that the electronic structure and optical properties of quantum dots can be altered by encountering X-ray/nuclear radiation or high energy particles. In particular, such encounters can generate direct fluorescent light generation or cause degeneration of the quantum dot material with attendant effects on the materials optical properties. Consequently, quantum dot loaded optical fibers can be used to develop a variety of sensors for direct or remote sensing of radiation parameters.

Wavelength conversion sensors and fibers: Use of embedded quantum dots in a cascade of response characteristics from shorter wavelengths to longer wavelengths enables the use of conventional detectors and filter elements sensitive to longer wavelengths for sensing short wavelength radiation. Such wavelength conversion could be enabled by the ordinary absorption/emission characteristics of the quantum dots or higher level optical properties such as Brilloiun and Raman scattering. For example, a holey fiber embedded with quantum dots which absorb at UV wavelengths below 350 nm and re-emit at wavelengths above 400 nm may be used with conventional silicon detectors instead of the less sensitive, more expensive extended response silicon detectors. Longer wavelength filter elements may also be used in this technique to enhance signal to noise ratio or other signal properties. Similarly, a mixture of quantum dots in varying sizes may broaden the absorption and emission band to allow detection of X-ray or nuclear radiation by conventional silicon detectors in replacement of conventional scintillation detectors. In each case, some portion of the light absorbed by the quantum dots is emitted at longer wavelengths to be sensed and/or filtered by detectors and filters whose performance characteristics peak at the longer wavelengths.

Figure 7:
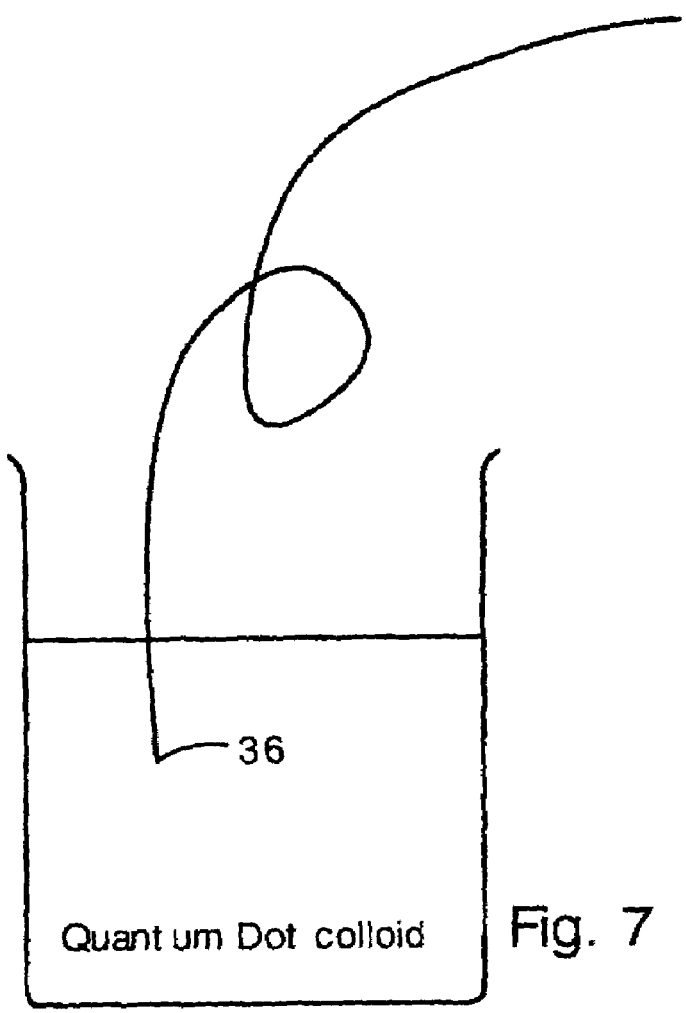
FIG. 7 illustrates a preferred method for making the present quantum dot optical fibers.

FIG. 7 illustrates a method for making the present quantum dot holey fibers. In the preferred method, a cut end 36 of a holey optical fiber is submerged in a colloid or suspension of quantum dots in a solvent. Alternatively, a sidewall of the fiber is etched, abraded or otherwise cut open to expose some of the holes 26, and the sidewall with exposed holes is submerged. Under the influence of capillary forces, the solvent is drawn into the holes of the holey fiber. The solvent can be heptane, xylene, or other hydrocarbons or alcohols, for example. Depending on hole size, solvent combinations and capillary assist methodology the colloid can travel millimeters to kilometers into the holey fiber. High vapor pressure solvents (low viscosity) will generally travel further into the optical fiber than low vapor pressure solvents. If the holes are too small (e.g. submicron size) some solvents might not be drawn into the holes without assistance. The hole size should be selected in view of the solvent to be used, the surface properties of the holes, and the desired distance for the quantum dots to be drawn into the fiber and the desired optical effect.

Capillary forces can result in long duration containment of the quantum dots. Capillary forces have been demonstrated to hold entrained quantum dots for storage times in excessive of two years in proof of principle experiments. Also, the ends of the fiber can be fused or melted (e.g. with a fusion splicer) so that the holes are sealed shut at the ends. Further the holey fiber can be fused to solid fibers both for sealing and connection into conventional fiber networks.

Optionally, the solvent can be removed (e.g., by vacuum evaporation) after the quantum dots have been inserted into the fiber. Also, the fiber can be submerged for a short duration (e.g., less than 1 second) so that the quantum dot colloid only travels a short distance. The resulting holey fiber with localized quantum dot distribution can be used as a sensor with localized sensitivity, for example. Quantum dot penetration may alternately be limited via other means, including mechanically induced blockages, splicing to solid element fibers and other methods as are obvious to those skilled in the state of the art.

Figure 8:
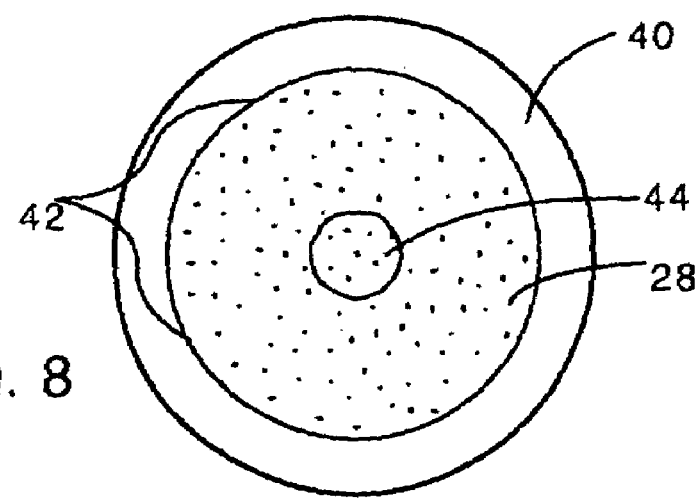
FIG. 8 shows a solid optical fiber having embedded quantum dots, and made of a low melting point glass.

FIG. 8 shows another embodiment of the invention in which the optical fiber is solid glass and contains embedded quantum dots. The fiber has a cladding region 42 and a core 44. The core 44 and cladding 42 both contain quantum dots 28. Alternatively, only the cladding or core contains quantum dots. Significantly, the fiber is made of a low-melting point glass that can be drawn into a fiber at temperatures that do not damage the quantum dots 28. For example, the fiber can be made of phosphate glasses (e.g. at least 25% phosphate), lead glasses or chalcogenide polymers, which can be drawn into a fiber at temperatures in the range of 300–700 degrees Celcius. Preferably, the fiber is made of a glass that can be drawn at a temperature less than 700 C, 600 C, 500 C or 400 C. The sheath, cladding and core can all be made of the same glass. The core 44 should have a dopant or slightly different composition so that it has a higher refractive index than the cladding, as well known in the art.

Of course, the quantum dots used must be resistant to the temperatures used to draw the optical fiber. Examples of suitable, heat-resistant quantum dot materials include tellurides, antimonies and CdSe since it has a boiling point between 600 and 700 degrees C. (depending on confinement conditions). In general, the quantum dot material should have a boiling point lower than the drawing temperature of the glass.

The optical fiber of FIG. 8 can be made by incorporating quantum dots into a fiber preform, and then drawing the fiber preform into an optical fiber. The fiber preform can comprise glass powder mixed with quantum dot materials, such as a quantum dot colloid or suspension as is common in the art with the technique known as solution doping (an extrinsic doping process). In this technique, a glass frit or power is deposited internal to a preform tube via chemical deposition or other means. The quantum dot bearing solvent is then placed in the preform in sufficient volume to allow the solvent to be entrained into the porous interior surface. After residual solvent is removed, the preform is collapsed and drawn into a fiber as is common in the art. In an alternate embodiment of this technique, the powder material may be impregnated with or bound to the quantum dot-solvent materials and then deposited in the preform as a slurry material). In this regard an extrinsic process is defined as one in which the quantum dots have been formed in a separate process prior to embedding in a final host material. By contrast an intrinsic process would form the quantum dots from their constituent materials during processing. For example if Cd and Se elements were used to dope a glass preform and the preform processed in such a manner that the CdSe quantum dots form on cooling an intrinsic process would be formed.

The optical fiber of FIG. 8 can be used for many applications such as light amplification, wavelength shifting, saturable absorption, and sensing in accordance with the nature of the structure and materials used. For example, the fiber of FIG. 8 with embedded quantum dots can be used as a force or strain sensor since the quantum dots will be affected by strain on the fiber.

It will be clear to one skilled in the art that the above embodiment may be altered in many ways without departing from the scope of the invention. Accordingly, the scope of the invention should be determined by the following claims and their legal equivalents.

What is claimed is:

1. A holey optical fiber comprising:
   a) a guiding region for carrying confined light;
   b) a plurality of holes in the optical fiber, wherein light confined to the guiding region exists as an evanescent wave in the holes;
   c) a plurality of quantum dots in the holes.

2. The holey optical fiber of claim 1 wherein the holey optical fiber is a photonic crystal-holey fiber or an index-guiding holey fiber.

3. The holey optical fiber of claim 1 wherein the holey optical fiber is a random-hole optical fiber.

4. The holey optical fiber of claim 1 wherein the holes are disposed in a cladding region of the optical fiber.

5. The holey optical fiber of claim 4 further comprising a solid core surrounded by the cladding region.

6. The holey optical fiber of claim 1 wherein the holes are disposed in a core region of the optical fiber.

7. The holey optical fiber of claim 1 further comprising a solvent disposed in the holes.

8. The holey optical fiber of claim 1 wherein the quantum dots are suspended in a solvent, colloid, gelatin or solid host.

9. The holey optical fiber of claim 1 wherein the quantum dots are supported by sidewalls of the holes.

10. The holey optical fiber of claim 1 further comprising a conventional solid fiber fusion spliced to the holey optical fiber so that the quantum dots are sealed within the holey optical fiber.

11. The holey optical fiber of claim 1 wherein the holes have a refractive index lower than the optical fiber material.

12. The holey optical fiber of claim 1 wherein the holes are sealed on at least one end so that the quantum dots are encapsulated within the fiber.

* * * * *